United States Patent
Enochs et al.

(10) Patent No.: US 6,827,249 B2
(45) Date of Patent: Dec. 7, 2004

(54) FLUXLESS TUBE SEAL

(75) Inventors: R. Scott Enochs, Gaston, OR (US); Travis Ernst, Portland, OR (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 10/261,408

(22) Filed: Sep. 30, 2002

(65) Prior Publication Data

US 2004/0060961 A1 Apr. 1, 2004

(51) Int. Cl.⁷ .............................................. B23K 37/04
(52) U.S. Cl. .......................................... 228/42; 228/46
(58) Field of Search ........................... 228/219, 33, 41, 228/42, 44.3, 44.7, 49.1, 49.5, 46

(56) References Cited

U.S. PATENT DOCUMENTS

| | | | | |
|---|---|---|---|---|
| 4,832,246 A | * | 5/1989 | Ono et al. ..................... | 228/1.1 |
| 4,979,664 A | | 12/1990 | Lyons et al. | |
| 5,061,035 A | | 10/1991 | Rogers, Jr. | |
| 5,065,932 A | * | 11/1991 | Hayden et al. ............... | 228/55 |
| 5,157,753 A | | 10/1992 | Rogers, Jr. | |
| 5,177,806 A | | 1/1993 | Abbott et al. | |
| 5,193,738 A | | 3/1993 | Hayes | |
| 5,492,265 A | * | 2/1996 | Wandke ....................... | 228/205 |
| 5,609,290 A | | 3/1997 | Bobbio et al. | |
| 6,102,273 A | * | 8/2000 | Satoh ........................... | 228/42 |
| 6,116,491 A | * | 9/2000 | Katoh .......................... | 228/42 |
| 6,168,065 B1 | * | 1/2001 | Willemen ...................... | 228/9 |
| 6,196,446 B1 | | 3/2001 | Fang et al. | |
| 6,202,293 B1 | * | 3/2001 | Schaller et al. ............... | 29/760 |
| 6,561,409 B1 | * | 5/2003 | Spirig .......................... | 228/59 |
| 2002/0131729 A1 | * | 9/2002 | Higgins, III ................. | 385/91 |
| 2003/0010813 A1 | * | 1/2003 | Nakaya ....................... | 228/245 |
| 2003/0127498 A1 | * | 7/2003 | Abe ............................ | 228/220 |
| 2003/0226877 A1 | * | 12/2003 | Tran et al. ............. | 228/180.21 |
| 2004/0060961 A1 | * | 4/2004 | Enochs et al. ................ | 228/52 |

FOREIGN PATENT DOCUMENTS

JP            363303303 A    * 12/1988

* cited by examiner

*Primary Examiner*—Kiley Stoner
(74) *Attorney, Agent, or Firm*—Irell & Manella LLP

(57) ABSTRACT

A solder machine that can automatically solder a fiber optic cable to a package. The solder machine includes a fixture for supporting the cable and the package. The machine has a gas heater that emits a heated inert gas. The gas heats at least a portion of the package to a soldering temperature. The machine also includes a solder dispenser that dispenses solder into the heated package. The solder attaches the fiber optic cable to the package. The inert gas prevents undesirable oxidation at the solder site. The use of an inert gas eliminates the need for solder flux. The heating, gassing and dispensing steps can be controlled by a computer to automate the entire process. The package and fiber optic cable can be supported by a pallet that is loaded and then unloaded from the machine to further improve the ease of operation and decrease the cost associated with the solder process.

16 Claims, 4 Drawing Sheets

FLUXLESS TUBE SEAL

BACKGROUND OF THE INVENTION

1. Field of the Invention

The subject matter disclosed generally relates to a machine and method for soldering a fiber optic cable to a package.

2. Background Information

Electro-optical devices such as laser diodes are typically packaged in a metal container (package) which has a fiber optic cable attached to the package. The fiber optic cable may be soldered to an outer tube of the package. Soldering the fiber optic cable to the tube provides strain relief for the cable and hermetic seal for the package. There are two primary techniques for soldering the cable to the package tube. In one technique, solder in the form of a wire is heated and melted onto the cable and tube. A flux is first applied to the area of solder to facilitate the process. The flux must then be cleaned from the package. The second technique includes placing a solder preform onto the cable and then melting the preform.

The soldering techniques of the prior art are manual operations that require soldering irons or some other device to heat the solder. It is inefficient to mass produce opto-electronic products with manual processes. Manual processes also introduce an element of human error that may result in lower yields and/or product quality. Additionally, the process of adding and removing flux further increases the cost of producing parts. It would be desirable to automate the process of attaching a fiber optic cable to an opto-electronic package.

BRIEF SUMMARY OF THE INVENTION

A solder machine that can solder a fiber optic cable to a package. The machine includes a fixture to support the cable and package, and a gas heater coupled to the fixture. The machine further includes a solder dispenser coupled to the fixture.

DETAILED DESCRIPTION

Disclosed is a solder machine that can automatically solder a fiber optic cable to a package. The solder machine includes a fixture for supporting the cable and the package. The machine has a gas heater that emits a heated inert gas. The gas heats at least a portion of the package to a soldering temperature. The machine also includes a solder dispenser that dispenses solder into the heated package. The solder attaches the fiber optic cable to the package.

The inert gas prevents undesirable oxidation at the solder site. The use of an inert gas eliminates the need for solder flux. The heating, gassing and dispensing steps can be controlled by a computer to automate the entire process. The package and fiber optic cable can be supported by a pallet that is loaded and then unloaded from the machine to further improve the ease of operation and decrease the cost associated with the solder process.

Figure 1:
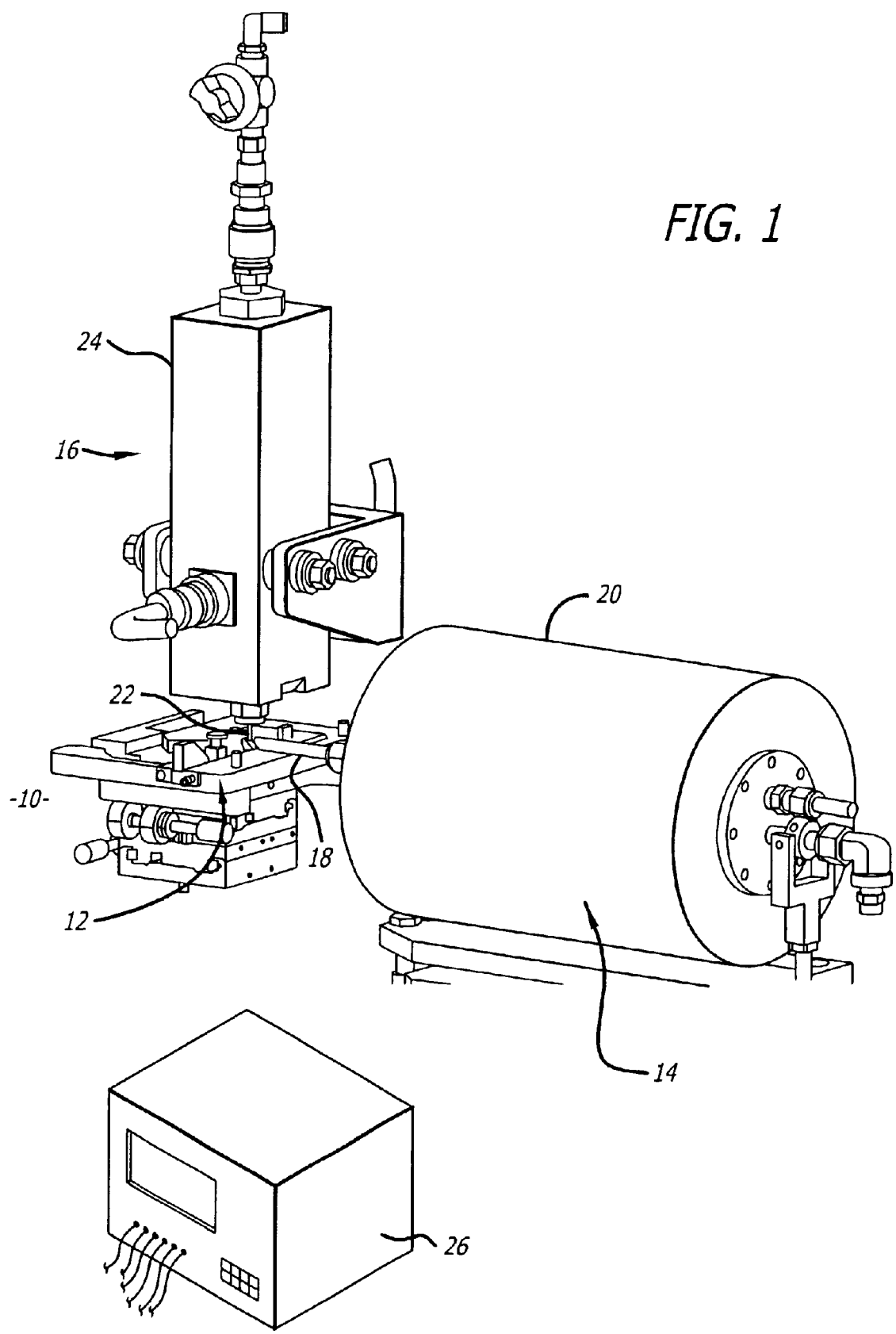
FIG. 1 is a perspective view of solder machine.

Referring to the drawings more particularly by reference numbers, FIG. 1 shows a solder machine 10. The solder machine 10 includes a fixture 12, a gas heater 14 and a solder dispenser 16. The gas heater 14 may include a tube 18 that is attached to a tank 20 filled with inert gas. The inert gas is preferably heated to a temperature above the melting point of the solder dispensed by the dispenser 16. The solder dispenser 16 may include a tip 22 that is attached to a reservoir 24 of molten solder. The reservoir 24 may contain an inert gas to insure that the top surface of the molten solder does not oxidize.

The dispenser 16 and gas heater 14 may each include valves, actuators, etc. that control the flow of solder and inert gas, respectively. The valves, actuators, etc. may be coupled to a controller 26 that automatically controls the flow of gas and dispensing of solder. The controller 26 may also be coupled to a pallet sensor (not shown in FIG. 1) that senses the presence of the parts that are to be soldered.

The controller 26 may contain a processor, memory, etc. that operates in accordance with a computer firmware and/or software program. The controller 16 can automatically allow the flow of gas and dispensing of solder in a predetermined sequence and for predetermined time intervals.

Figure 2:
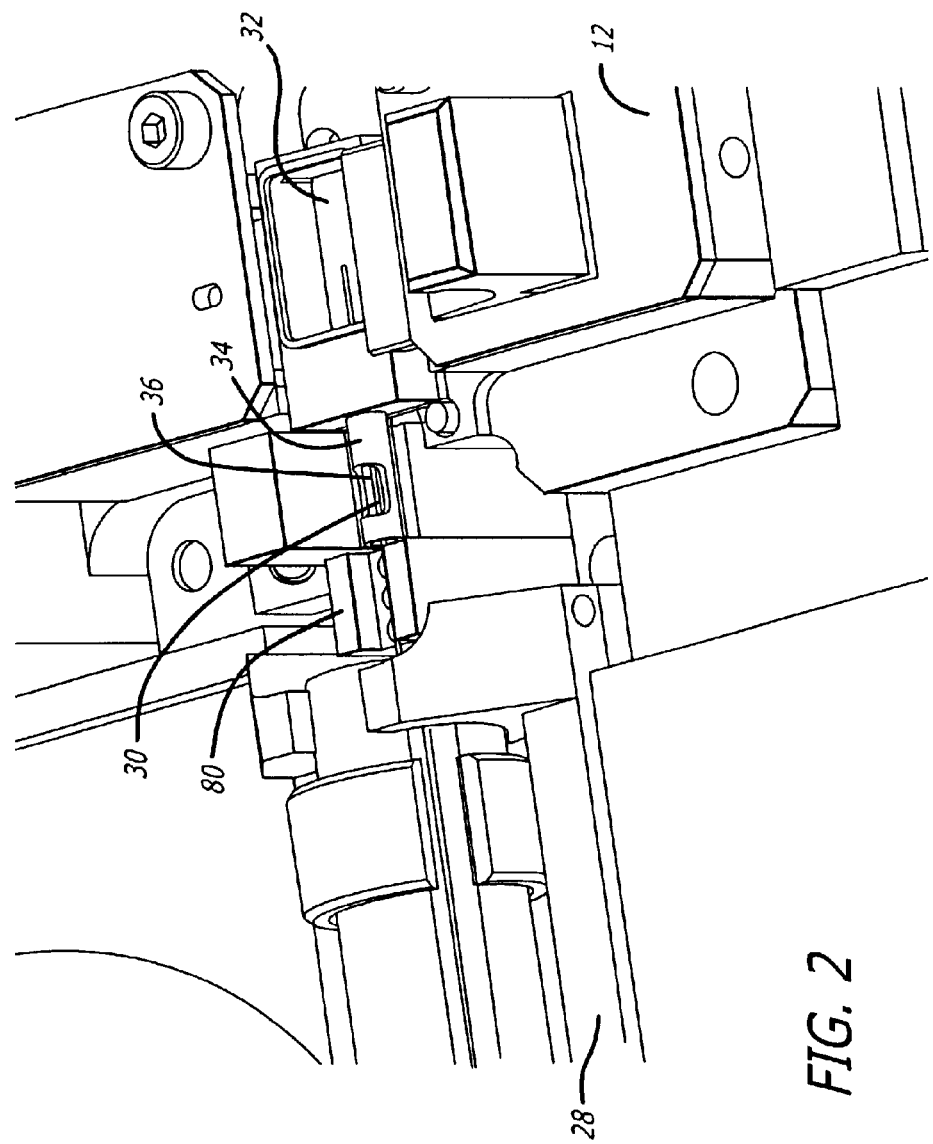
FIG. 2 is a perspective view of the fiber optic cable and a package loaded into the machine.
Figure 3:
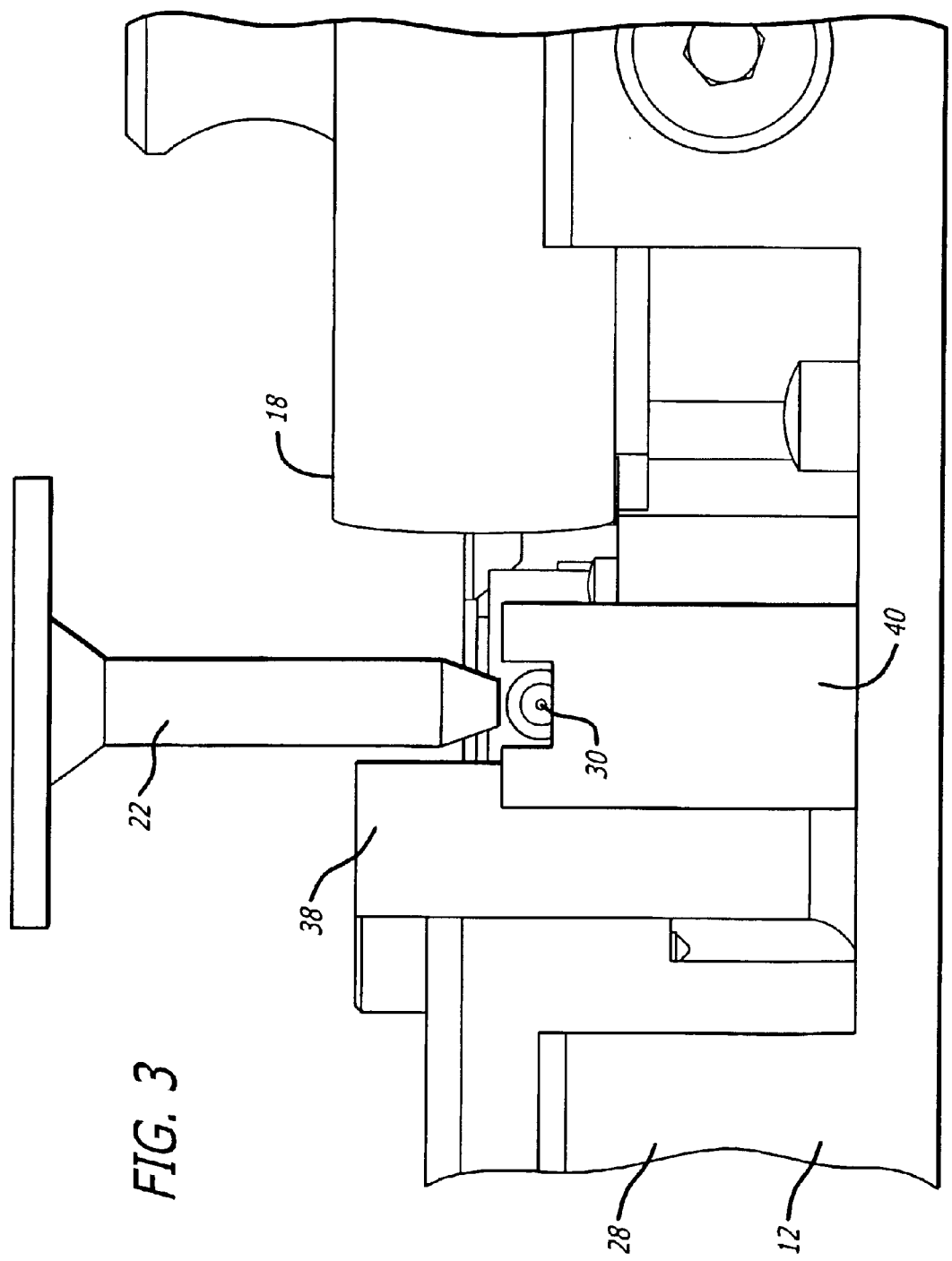
FIG. 3 is a side view showing the cable and package adjacent to a heater tube and a dispenser tip of the machine.

As shown in FIGS. 2 and 3, the fixture 12 may include a pallet 28 that supports a fiber optic cable 30 and a package 32. The package 32 may include a tube 34 which has a fill port 36. Solder is dispensed into the fill port 36 to attach the cable 30 to the package 32. The pallet 28 is located within the machine 10 so that the fill port 36 is adjacent to the gas heater tube 18 and solder dispenser tip 22. Although one cable 30 is shown and described, it is to be understood that a plurality of cables can be attached to the package 32. Additionally other optical components such as lenses or isolators can be attached to the package with machine 10.

The tube 18 directs heated inert gas across the package tube 34 to heat the tube 34 and the adjoining fiber cable 30 to a soldering temperature. The soldering temperature may be the melting temperature of the solder. Alternatively, the soldering temperature may be below the melting temperature but at a temperature sufficient for welting of the solder. The machine 10 may include a gas baffle 38 that maintains the inert gas within the area of the heated tube 34. After a predetermined time interval a volume of molten solder is dispensed by the tip 22 into the fill port 34. The inert gas prevents oxidization of the solder and facilitates the solder process without having to use a solder flux. The fluxless soldering process does not require a post solder cleaning step. Consequently, the fluxless solder process is quicker and more apt to automation than processes that include the application of flux.

After the molten solder is dispensed the stream of heated gas is terminated and the solder is allowed to cool and solidify. The machine 10 may include a cooling block 40 that provides a heat sink for the fiber cable 30.

Figure 4:
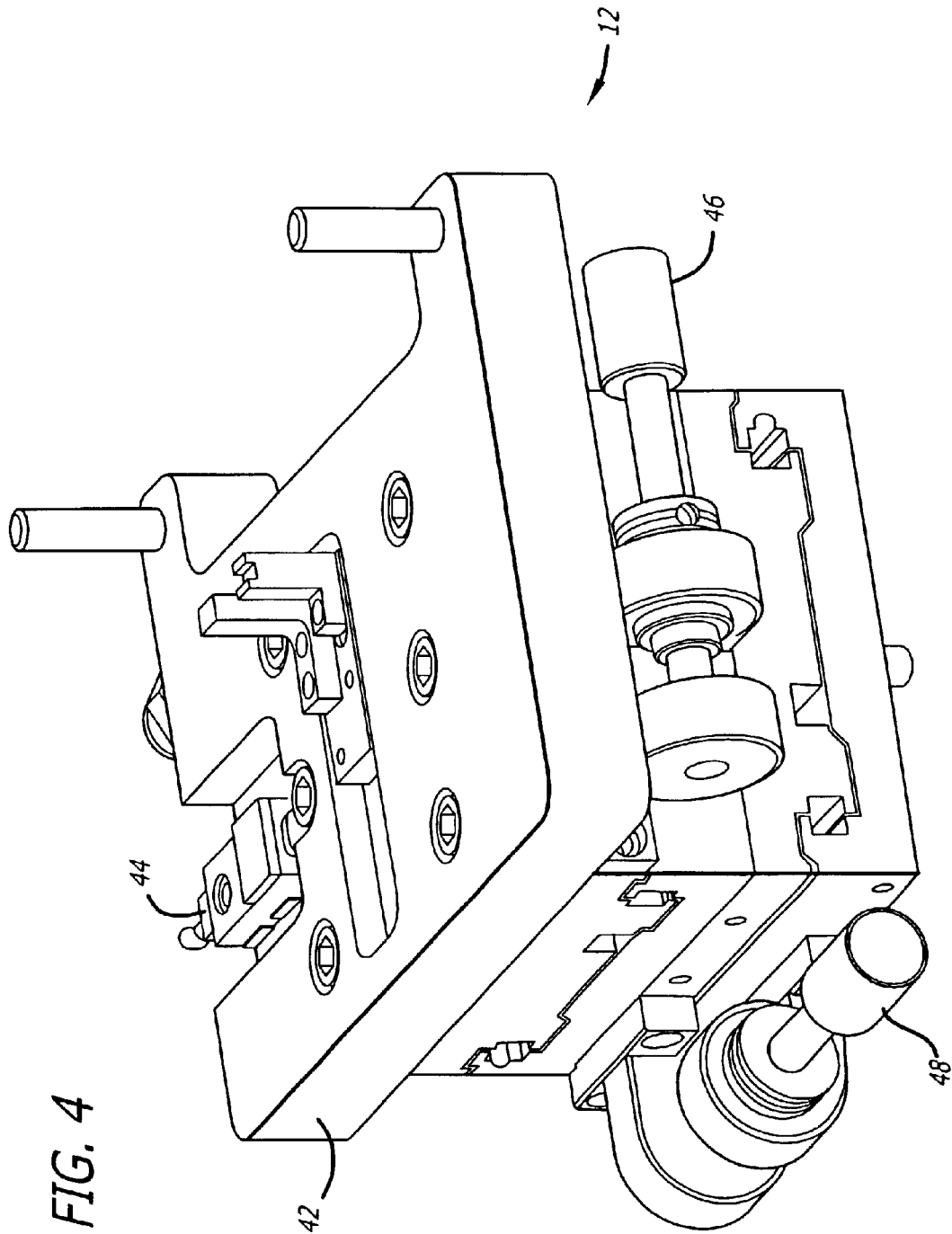
FIG. 4 is a perspective view of a fixture block of the machine.

As shown in FIG. 4 the fixture 12 may include a block 42. The pallet 28 may be loaded onto and off of the block 42. The block 42 may include a pallet sensor 44 that is coupled to the controller shown in FIG. 1. The sensor 44 senses when the pallet 28 and accompanying parts are loaded into the machine 10.

The block 42 may further include an x-axis adjustment screw 46 and a z-axis adjustment screw 48. The screws 46 and 48 can move the block 42 and pallet 44 so that the fill port 34 of the package 30 is properly aligned with the dispenser tip 22 and gas tube 18.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, the package may be heated with an induction block or coil, or a microflame.

What is claimed is:

1. A solder machine that is used to solder an optical component to a package, comprising:

a fixture;

an inert gas heater coupled to said fixture;

a solder dispenser coupled to said fixture.

2. The solder machine of claim 1, further comprising an inert gas baffle coupled to said fixture.

3. The solder machine of claim 1, further comprising a cooling block coupled to said fixture.

4. The solder machine of claim 1, wherein said inert gas heater includes a tube that is attached to a tank filled with inert gas.

5. The solder machine of claim 1, wherein said solder dispenser includes a dispensing tip attached to a reservoir of solder.

6. The solder machine of claim 1, wherein said fixture includes a block, and a pallet that can be loaded onto said block.

7. The solder machine of claim 1, wherein said fixture includes an x-axis adjustment screw and a z-axis adjustment screw.

8. The solder machine of claim 1, further comprising a controller coupled to said inert gas heater and said solder dispenser.

9. A solder machine for soldering an optical component to a package, comprising:

support means for supporting the optical component and the package;

heater means for heating at least a portion of the package and optical component, said heater means being coupled to said support means;

gas means for directing an inert gas onto the heated portion of the package and optical component, said gas means being coupled to said support means; and, solder dispenser means for dispensing a solder into the heated portion of the package and optical component.

10. The solder machine of claim 9, further comprising baffle means for containing the inert gas within an area of the heated portion of the package and optical component.

11. The solder machine of claim 9, further comprising cooling means for cooling the optical component.

12. The solder machine of claim 9, wherein said heater means and said gas means include a tube attached to a tank of heated inert gas.

13. The solder machine of claim 9, wherein said solder dispenser means includes a dispensing tip attached to a reservoir of solder.

14. The solder machine of claim 9, wherein said support means includes a block, and a pallet that can be loaded onto said block.

15. The solder machine of claim 14, wherein said support means includes means for adjusting a position of said block.

16. The solder machine of claim 9, further comprising controller means for controlling the flow of inert gas and dispensing of solder.

* * * * *